US012198333B2

(12) United States Patent
Kwon

(10) Patent No.: US 12,198,333 B2
(45) Date of Patent: Jan. 14, 2025

(54) METHOD OF PROVIDING DIAGNOSTIC INFORMATION ON BRAIN DISEASE USING GRAY-LEVEL CO-OCCURRENCE MATRIX AND PYRAMID DIRECTIONAL FILTER BANK CONTOURLET TRANSFORM WITH KERNEL SUPPORT VECTOR MACHINE

(71) Applicant: Industry-Academic Cooperation Foundation Chosun University, Gwangju (KR)

(72) Inventor: Goo-Rak Kwon, Gwangju (KR)

(73) Assignee: INDUSTRY-ACADEMIC COOPERATION FOUNDATION CHOSUN UNIVERSITY, Gwangju (KR)

( * ) Notice: Subject to any disclaimer, the term of this patent is extended or adjusted under 35 U.S.C. 154(b) by 321 days.

(21) Appl. No.: 17/592,784

(22) Filed: Feb. 4, 2022

(65) Prior Publication Data
US 2023/0067798 A1     Mar. 2, 2023

(30) Foreign Application Priority Data
Aug. 10, 2021   (KR) .................. 10-2021-0105499

(51) Int. Cl.
*G06T 7/00*     (2017.01)

(52) U.S. Cl.
CPC ............. *G06T 7/0012* (2013.01); *G06T 2207/10088* (2013.01); *G06T 2207/20081* (2013.01);
(Continued)

(58) Field of Classification Search
CPC ............. G06T 7/0012; G06T 7/00; G06T 2207/20081; G06T 2207/30016; G06T 2207/10088; G06T 2207/20221
See application file for complete search history.

(56) References Cited

U.S. PATENT DOCUMENTS

2016/0341712 A1* 11/2016 Agar .................. G01N 33/4833

FOREIGN PATENT DOCUMENTS

| KR | 10-2012-0050379 | | 5/2012 | |
| KR | 20120050379 | * | 5/2012 | ............. A61B 5/055 |

(Continued)

OTHER PUBLICATIONS

Yubraj Gupta, et al., "An MRI brain disease classification system using PDFB-CT and GLCM with kernel-SVM for medical decision support", Multimedia Tools and Applications (2020) 79:32195-32224, Aug. 26, 2020, https://doi.org/10.1007/s11042-020-09676-x.

(Continued)

*Primary Examiner* — Tuan H Nguyen
(74) *Attorney, Agent, or Firm* — LEX IP MEISTER, PLLC

(57) ABSTRACT

The present invention relates to a method of providing diagnostic information for brain diseases classification, which can classify brain diseases in an improved and automated manner through magnetic resonance image pre-processing, steps of contourlet transform, steps of feature extraction and selection, and steps of cross-validation. The present invention relates to a diagnostic information providing method capable of providing an optimal diagnostic means. The present invention relates to a method for providing diagnostic information for brain diseases classification, and relates to a method for providing an optimal diagnostic means for classifying brain diseases in an improved and automated manner through the steps of the magnetic resonance imaging pre-processing, contourlet transform, feature extraction and selection, and cross-validation.

7 Claims, 9 Drawing Sheets

(52) U.S. Cl.
CPC ............ *G06T 2207/20221* (2013.01); *G06T 2207/30016* (2013.01)

(56) References Cited

FOREIGN PATENT DOCUMENTS

| KR | 10-1929965 | 12/2018 |
| KR | 10-2143940 | 8/2020 |
| KR | 10-2241357 | 4/2021 |

OTHER PUBLICATIONS

Shyna A et al., "Automatic Detection and Segmentation of Ischemic Stroke Lesion from Diffusion Weighted MRI using Contourlet Transform Technique", International Journal of Engineering Research & Technology (IJERT), vol. 3 Issue 4, Apr. 2014, pp. 2335-2341.
Hardeep kaur et al., "MRI brain image enhancement using Histogram equalization Techniques", IEEE, pp. 770-773, Mar. 25, 2016.
Irem Ersöz Kaya et al., "PCA based clustering for brain tumor segmentation of T1w MRI images", Computer methods and programs in biomedicine vol. 140, pp. 19-28, Mar. 31, 2017.

* cited by examiner

[Fig. 1]
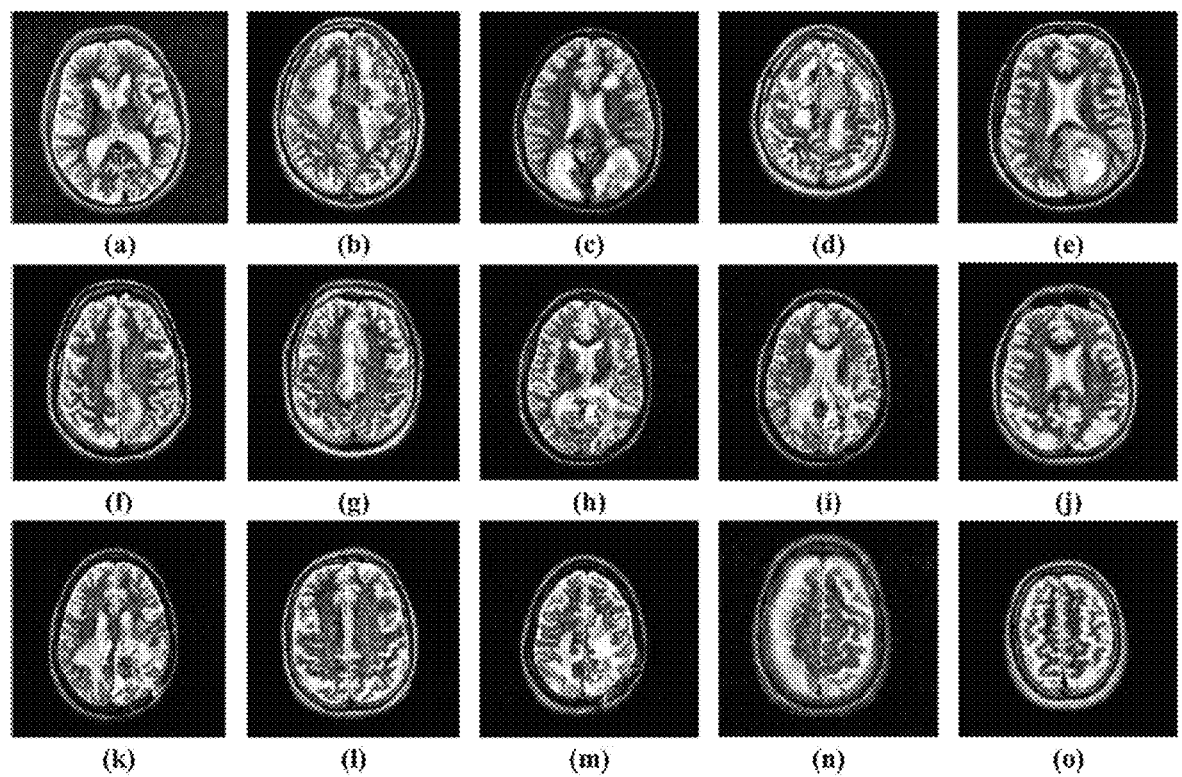

[Fig. 2]
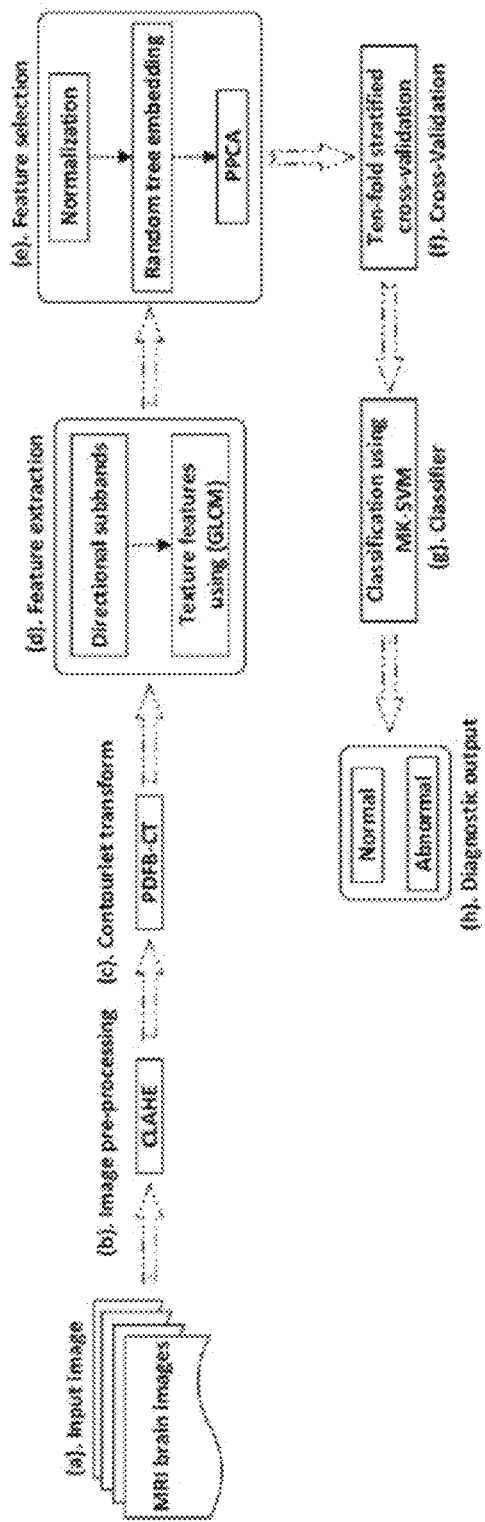

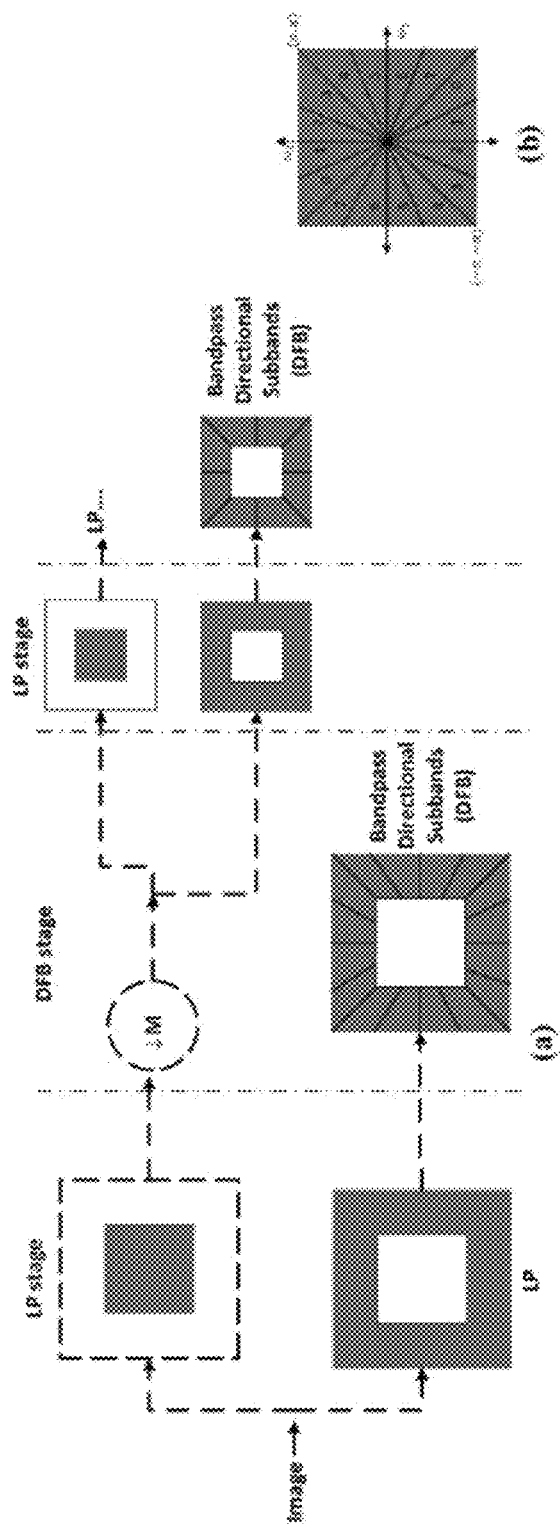
[Fig. 3]

[Fig. 4]
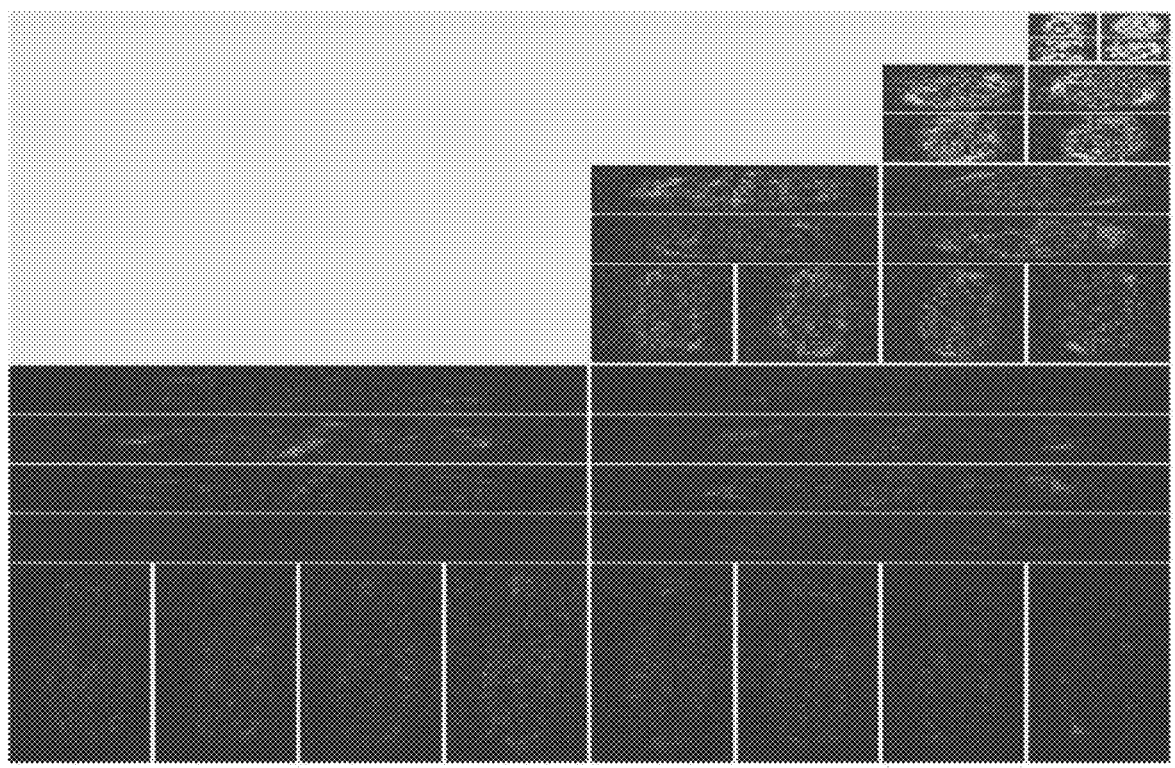

[Fig. 5]
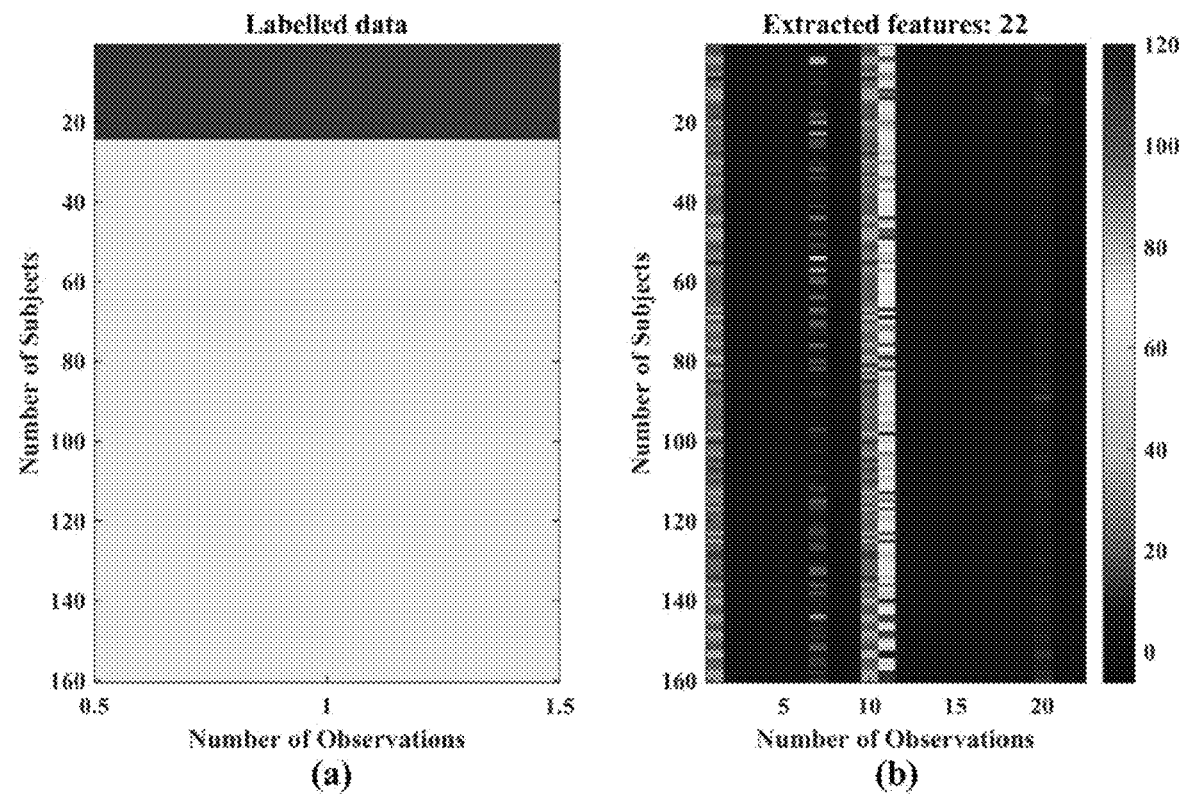
[Fig. 6]
| Images | Mean | SD | Skewness | Kurtosis | RMS | Contrast | Entropy |
|---|---|---|---|---|---|---|---|
| Image 1 | 4.24 | 3.68 | 0.69 | 2.07 | 4.88 | 3.03 | 3.03 |
| Image 2 | 4.44 | 3.84 | 0.25 | 1.67 | 4.78 | 2.36 | 3.11 |
| Image 3 | 4.20 | 3.77 | 0.73 | 2.21 | 4.86 | 2.37 | 2.85 |
| Image 4 | 2.64 | 3.42 | 0.83 | 2.09 | 3.28 | 1.94 | 2.41 |
| Image 5 | 3.83 | 3.53 | 0.85 | 2.30 | 4.49 | 2.71 | 2.86 |
| Image 6 | 3.24 | 3.89 | 0.87 | 2.46 | 4.04 | 2.50 | 2.64 |

[Fig. 7]

[Fig. 8]
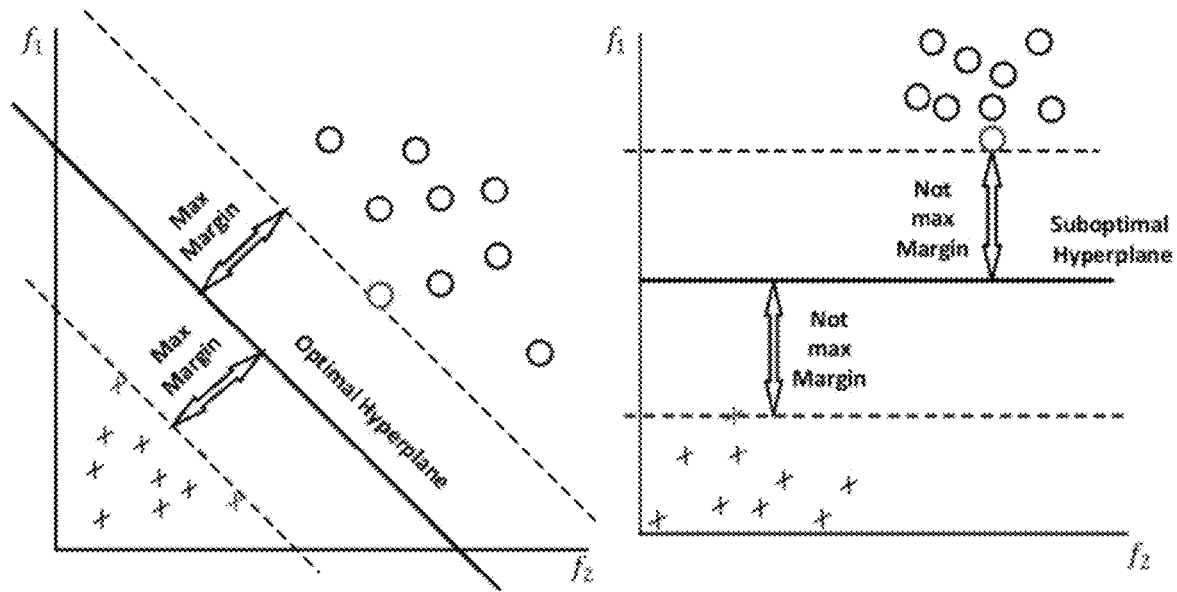
[Fig. 9]
| True Class | Predicted class | |
|---|---|---|
| | $B_1(Patients)$ | $B_2(Controls)$ |
| $B_1(Patients)$ | TP | FN |
| $B_2(Controls)$ | FP | TN |
[Fig. 10]
| Group | Regularization constant (c) | Gamma (g or γ) | Best CV score |
|---|---|---|---|
| Abnormal vs. normal | 8 | 0.001 | 0.9892 |

[Fig. 11]
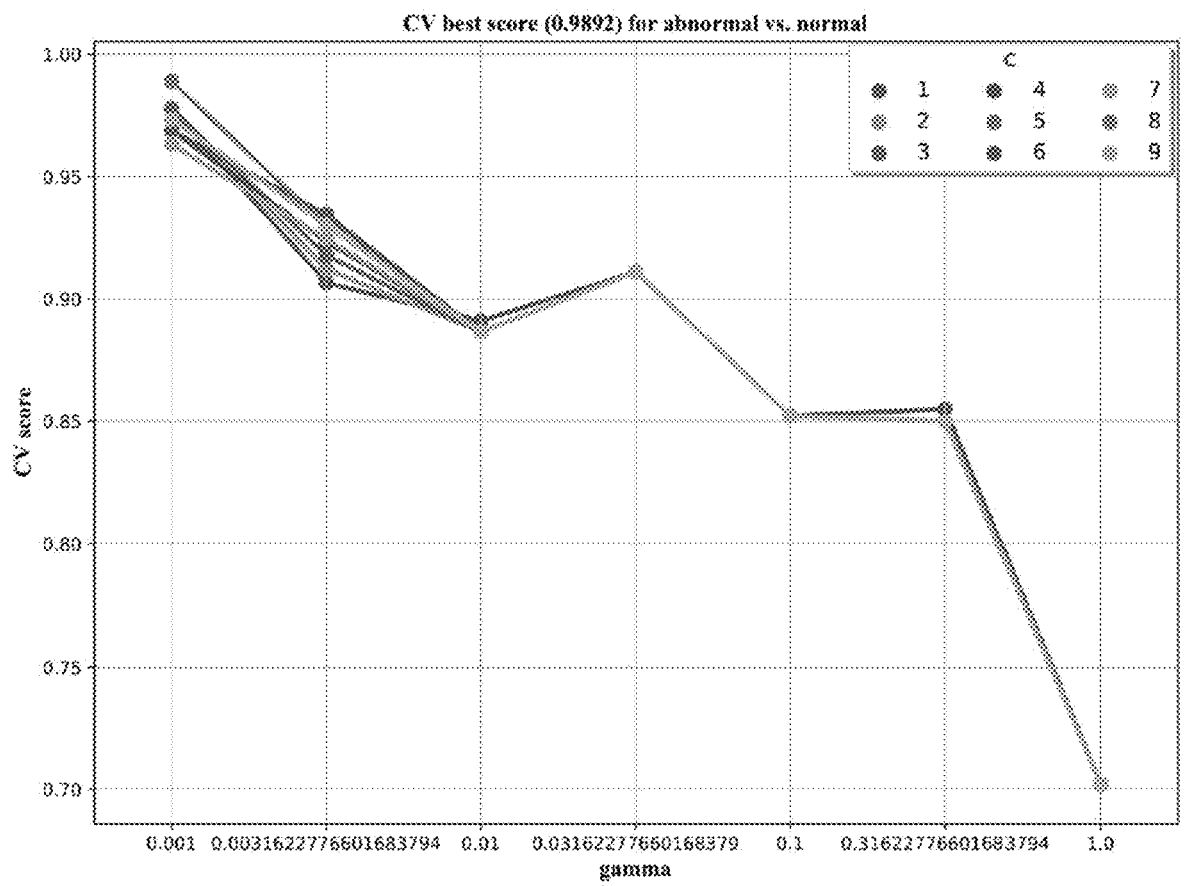
[Fig. 12]
| Abnormal vs. normal | Classifier | Performance measure | | | | | | |
|---|---|---|---|---|---|---|---|---|
| | | AUC | ACC | SEN | SPEC | PRE | F1-score | Cohen's Kappa |
| DWT+ GLCM+PPCA+MK-SVM | MK-SVM | 98.75 | 97.92 | 100 | 97.56 | 95.5 | 93.33 | 0.9211 |
| PDFB-CT + GLCM+PPCA+MK-SVM | | 100 | 100 | 100 | 98.24 | 97 | 98.71 | 0.9763 |

[Fig. 13]
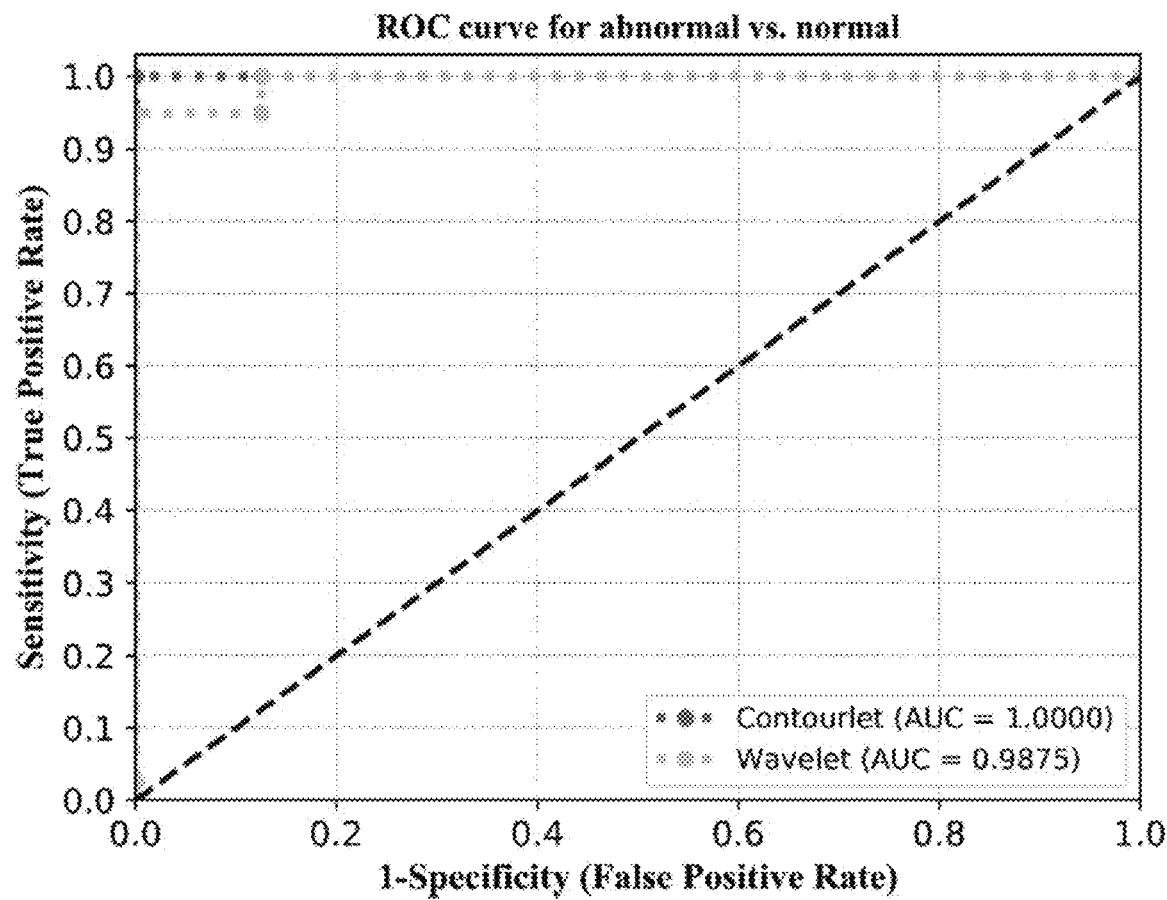

METHOD OF PROVIDING DIAGNOSTIC INFORMATION ON BRAIN DISEASE USING GRAY-LEVEL CO-OCCURRENCE MATRIX AND PYRAMID DIRECTIONAL FILTER BANK CONTOURLET TRANSFORM WITH KERNEL SUPPORT VECTOR MACHINE

TECHNICAL FIELD

The present invention relates to a method of providing diagnostic information for a brain disease using a co-occurrence matrix of a kernel support vector machine and a pyramid-directed filter bank-contourt transformation.

BACKGROUND ART

Brain diseases like degenerative disease, cerebrovascular disease, and neoplastic disease, etc, are observed in people of all groups throughout the globe [1-4]. Some of these disease-causing minor problems in the individual brain and some provoke death. These diseases are progressive and their occurrence increases with age. Previously, developed non-invasive diagnosis methods have relied primarily on patient history, clinical observations, and cognitive assessments. Recently, researchers have demonstrated the sensitivity of different biomarkers for early classification using brain neuroimages [5-7]. The standard medical imaging modalities such as MRI, positron emission tomography (PET), functional MRI, computed tomography (CT) are used to detect the abnormalities in the brain [8-12]. MRI employs magnetic fields and radio ripples to produce high-quality MR images of the anatomical form of the brain without the use of radioactive traces. However, MRI due to its dominant properties like excellent soft-tissue anatomy contrast, non-invasive characteristics, and high spatial resolution has been drastically improved the attribute of brain pathology diagnosis and cure it by identifying the brain and nervous system abnormalities [8, 13, 14]. MRI is mainly employed to diagnose distinct types of disorders such as tumors, strokes, bleeding, multiple sclerosis (MS), infections or blood vessel disease, and injury. However, the amount of data is far too heavy for manual evaluation and hence there is a huge need for the development of automated pathological brain detection image analysis tools using computer-aided diagnosis (CAD) for the detection of the human brain from these brain diseases [15-21].

These systems can be helpful for medical personnel with the diagnosis, prognosis, pre-surgical and post-surgical process, and as well as for other tasks. The level of detail provided by the MRI can be seen as impressive as compared to other neuroimaging modalities. MRI provides (2-D) two-dimensional and 3-D images of organs and structures of the body [8]. The most obvious feature of the human brain is its symmetry, which is apparent in axial and coronal brain MRI images. By contrast, asymmetry in axial images strongly indicates abnormalities or disease. Thus these essential features can be modeled using different image and signal processing methods to classify normal and abnormal brain MRI images [18, 32, 33, 35].

Numerous approaches have been employed using wavelet families or it's variants to extract features from the MR brain images for the task of binary classification. Chaplot et al. [1] have utilized a 2D-DWT and four Daubechies filters to obtain the approximation coefficients as well as utilized a self-organization feature map (SOM) and SVM for classification. The author in [2] has utilized the coefficients of the sub-band of the DWT method as a feature vector which is extracted from each MR brain image. Then, PCA was applied to the obtained feature map to reduce the number of feature coefficients. Later, they have used two different types of classifiers: k-nearest neighbor (KNN) and feed-forward back-propagation-ANN (FP-ANN) to categorize images as abnormal and normal. In another work, Zhang et al. [5, 6, 22-24] have used the third-level of coefficients of sub-band of 2D-DWT for extraction of feature and it is followed by PCA for feature dimensionality reduction purpose. Moreover, they have used different types of classifiers with improved parameter optimization method like scaled chaotic artificial bee algorithm (SCABC) with FNN [5], FNN with adaptive chaotic particle swarm optimization (ACPSO) [22], BPNN with the scaled conjugate gradient (SCG) [6], kernel-SVM with different kernels: linear, homogeneous polynomial, Gaussian radial basis (GRB) and inhomogeneous polynomial (IPOL) [23] and KSVM with PSO [24], have been used for isolating the abnormal and normal MR brain images. Saritha et al. [7] proposed a novel method that has used a feature of wavelet-entropy (WE) technique and utilized spider-web plots (SWP) to reduce features. Later, they have applied a probabilistic neural network (PNN) for classification. In [14], authors have utilized a two-level approximation sub-band of 2D-DWT for feature extraction. Later they have modeled it by generalized auto-regressive conditional hetero-scedasticity (GARCH) model. The parameter obtained from the GARCH model is considered as the initial feature vector. After feature vector normalization, PCA and linear discriminant analysis (LDA) is used to attain the proper attributes and remove the redundancy from the primary feature vector. Finally, the extracted features are employed to the SVM and KNN classifiers distinctly to determine the normal image or disease type. The author in [25] have used the feed-back pulse-coupled neural network (FBPNN) for image segmentation, and sub-bands of DWT for feature extraction, and later PCA was used for reducing the dimensionality of the gained wavelet coefficients, and FBPNN to classify inputs into abnormal or normal. Later, Zhang et al. [27] have used a different type of feature extraction methods like a weighted fractional Fourier transform (WFRFT) to obtain spectrums from the MR images [27], wavelet packet Tsallis entropy (WPTE) features [28], and discrete wavelet packet transform (DWPT) to obtain wavelet packet coefficients [29] from each MR image. Afterward, they used the PCA to reduce spectrum features to only (26) [27]. Tsallis entropy (TE) and Shannon entropy (SE) were harnessed to extract entropy features from DWPT coefficients [29]. Moreover, they passed these extracted features from different classifiers with improved optimization methods like those reduced spectral attributes of different instances were combined and then they fed into SVM [27], Fuzzy algorithm with SVM [28], generalized eigenvalue proximal SVM (GEPSVM), and GEPSVM with Gaussian radial basis function (RBF) [29] kernel to classify inputs into normal or abnormal. Likewise, later Wang et al. [20] have recommended using stationary-WT (SWT) to replace DWT, and hybridization of particle swarm optimization (HPSO) and artificial bee colony (HPA) method was proposed to train the classifier. The author in [21, 26] have utilized a wavelet-entropy as the feature descriptor and later they applied a Naive Bayes classifier (NBC) [26] and PNN [21] to classify normal or abnormal group. Nayak et al. [4] have utilized 2D-DWT for the extraction of features from the images. After that, feature vector normalization, PPCA is applied to reduce the dimensionality of extracted features. Later, the reduced features were sent to the AdaBoost algorithm with a random forest classifier to categorize MR brain images into normal and abnormal. In, [30] author have utilized a canny edge detector to extract brain edges. Next, they have estimated the fractal dimension utilizing box counting technique with grid sizes of 1, 2, 4, and 16, respectively. Afterward, they have employed the single-hidden layer feed-forward neural network with improved PSO based on three-segment particle illustration, time-varying acceleration factor, and chaos theory for the classification purpose. Later on, [31] have followed the [7] experiment by utilizing WE as a feature descriptor. Later, they have passed the extracted features from a KSVM to classify inputs into normal or abnormal. Quantum-behaved-PSO (QPSO) was introduced to adjust the weights of the SVM. Nayak et al. [15] have utilized SPCNN for the extraction of the region and FDCT for the extraction of features from the MR images and later they have passed these features from PCA and LDA for dimensionality reduction purpose and later the reduced feature is passed through the PNN for the classification purpose. Wang et al. [33] have utilized a stationary wavelet transform (SWT) with entropy to extract brain image features and later, they have passed the extracted features from an RBF-KSVM to classify inputs into normal or abnormal. The author in [32] has used synthetic minority oversampling (SMO) to balance the dataset. After that, they have passed wavelet packet Tsallis entropy to extract features from the MR images, and later they have passed these extracted features from extreme learning machines with the combination of Jaya algorithm to classify inputs into normal or abnormal. Furthermore, In [16] the author has selected fifty largest coefficients from each sub-band of a 5-level FDCT to serve as a feature map for each image. PCA has been used for dimensional reduction purposes. Moreover, least-squares SVM with three distinct kernels is utilized to classify the images as healthy or pathological. While in [17] the author utilized discrete ripplet-II transform (DR2T) of second-degree for the extraction of features from the MR brain images. Later, they have employed the PCA+LDA approach to reduce the huge number of coefficients obtained from DR2T. Finally, an improved hybrid learning method called MPSO-ELM has been proposed to combine modified-PSO (MPSO) and extreme learning machine (ELM) for classification of MR images as pathological or healthy. Gudigar et al. [34] have studied the performance of three distinct multiresolution analysis techniques: DWT, shearlet transform and curvelet transform for detecting brain abnormalities and later they have extracted texture features from the transformed image which are optimally selected using PSO, and later classified using support vector machine (SVM). Nayak et al. [18] have suggested to use automated technique based on deep-ELM (DL-ELM) stacked with ELM based autoencoders for the multiclass classification of the pathological brain disease. Afterward, Nayak et al. [35] have utilized FCT and TE to extract features from MR images. A kernel extension of random vector functional link network (KRVFL) is used to perform multiclass classification and improve the generalization performance at faster training speed.

Most of the previously stated abnormal brain classification methods [4, 15, 29, 33-36] utilize wavelet transform (WT) or it's variants such as the DWT, SWT, dual-tree complex wavelet transforms (DTCWT), CT, DWPT, WE, for the extraction of features from the MR brain image. The standard DWT has drawbacks in terms of its partial directional selectivity and also in its shift variance, it also can't capture curve like features effectively from the image. DWT provides directionality but it is limited to horizontal, vertical and diagonal directionality. Moreover, SWT can resolve shift in-variance problems, but it has another issue of greater redundancy and it does not signify higher dimensional singularities. Further, DTCWT is efficient and less redundant which provides more directional selectivities (i.e., six) as compared to other WT. Here, it can be presumed that all these transforms are fewer capable of managing 2D-singularities. Thus, further improvements in directional selectivity need to be studied to capture curve like structures from MR brain images. Thus, to address the above problem, we proposed a new method for early classification of MR brain disease, which achieves potential improvements compared to other state-of-the-art procedures. In our case, to capture all curve like features and also to select every directional, we have selected contourlet transform (CT) in our experiment. The pyramidal directional filter bank contourlet transform (PDFB-CT) [37] is a powerful and efficient transform, which provides $C^2$ directional singularity which gives good results along with every curve [38]. As it is designed to handle curves by using only a few coefficients and it also can show images at numerous scales and angles. Moreover, here, we have used probabilistic principal component analysis (PPCA) [39] which addresses the limitations of regular PCA by efficiently reducing dimensionality in terms of the allocation of latent variables. Traditional PCA is sensitive to anomalous structures because the calculation of the covariance matrix and sample means can be significantly affected by a small number of outliners [40]. Maximum-likelihood approximations and probability models deal with the missing datasets, it also combines multiple PCA in a probabilistic mixture way, these were the inspirations for using PPCA in this paper.

The suggested method utilizes contrast-limited adaptive histogram equalization (CLAHE) [41, 42] for the enhancement of MR images at a pre-processing stage and later we have passed these enhanced images through PDFB-CT for decomposition into different resolution levels and a series of (22) features are extracted by using GLCM [43] texture features extraction. After that, the feature vector normalization step was applied to transform the samples in such a way that its allocation will have an average mean of 0 and a standard deviation of 1 to reduce the dependency and redundancy of the data. Furthermore, PPCA is applied to decrease the dimensionality of the extracted feature vector. Finally, the multi-kernel SVM (MK-SVM) [44] with a 10-fold stratified cross-validation method is employed to classify MR brain images into normal and abnormal.

PRIOR ART

Patent

1. Korean Patent Registration No. 1929965
2. Korean Patent Registration No. 2241357
3. Korean Patent Registration No. 2143940

DETAILED DESCRIPTION OF THE INVENTION

Summary

It is an object of the present invention to provide a method of providing diagnostic information for brain disease classification by classifying types of brain diseases through magnetic resonance image preprocessing, contourlet transformation steps, feature extraction and selection steps, and cross-validation steps.

Technical Problem

The present invention provides a method of providing diagnostic information for brain disease classification, including steps of 1) image input; 2) image preprocessing; 3) Contourlet transform; 4) feature extraction; 5) feature selection; 6) cross-validation; 7) classifying the brain disease; and 8) outputting the brain disease classification result, wherein the step of 3) Contourlet transform uses a pyramid directional filter bank contourlet transformation.

According to an embodiment of the present invention, wherein the step of 2) image preprocessing uses contrast limited adaptive histogram equalization.

According to another embodiment of the present invention, wherein the step of 4) feature extraction uses a gray-level co-occurrence matrix.

According to other embodiment of the present invention, wherein the step of 5) feature selection uses a probabilistic principal component analysis.

According to an embodiment of the present invention, wherein the step of 6) cross-validation uses a 10-fold stratified cross-validation.

According to another embodiment of the present invention, wherein the step of 7) classifying the brain disease classifies a multiple kernel support vector machine classifier, and wherein the step of 8) outputting the brain disease classification result is to output the classification result as normal or abnormal.

According to other embodiment of the present invention, wherein the brain disease is at least one selected from the group consisting of degenerative brain disease, cerebrovascular disease, neoplastic brain disease, stroke, cerebral hemorrhage, multiple sclerosis, brain infection and traumatic brain injury.

Technical Solution

The method of providing diagnostic information for brain disease classification of the present invention can have the effect of providing an optimal diagnostic means capable of classifying brain diseases in an improved and automated manner through magnetic resonance image preprocessing, steps of contourlet conversion, step of feature extraction and selection, and step of cross-validation

BRIEF DESCRIPTION OF THE DRAWINGS

FIG. 1. Sample of MR brain Images (a) Normal brain (b) Alzheimer's with Visual Agnosia disease (c) Alzheimer's disease (d) Cerebral Toxoplasmosis disease (e) Chronic subdural hematoma disease (f) Glioma FDG-PET disease (g) Glioma TiTc-SPECT with a tour disease (h) Glioma TiTc-SPECT disease (i) Herpes encephalitis with a tour disease (j) Huntington's disease (k) Meningioma disease (l) Multiple Sclerosis diseases (m) Picks disease (n) Sarcoma disease (o) Mild Alzheimer's with FDG-PET and MRI.

FIG. 2. Overview of the proposed method. (a) Input image. (b) Image pre-processing using the CLAHE method. (c) Contourlet transform. (d) Feature extraction using a combined process (contourlet directional sub-bands and with GLCM). (e) Feature selection using the Probabilistic PCA method. (f) Ten-fold stratified cross-validation method. (g) Multi-kernel SVM classifier. (g) Diagnostic output.

FIG. 3. (a) Decomposition structure of contourlet transform and (b) Directional filter bank, frequency spectrum partitioning with 8 directional bands FIG. 4. Diagram of a 4-level PDFB-CT FIG. 5. Label data and 22 extracted features FIG. 6. First-order statistical features FIG. 7. Second-order statistical features FIG. 8. SVM optimal hyperplane FIG. 9. Confusion Matrix for a binary image classifier to distinguish between two classes FIG. 10. Obtained best CV score for (Abnormal vs. Normal)

FIG. 11. CV best accuracy obtained for (abnormal vs. normal) group.

FIG. 12. Classification result for (Abnormal vs. Normal) group

FIG. 13. AU-ROC curve plotted between abnormal and normal subjects.

DETAILED DESCRIPTION

Hereinafter, the present invention will be described in more detail through examples. These examples are only for illustrating the present invention and should not be construed as limiting the scope of the present invention to these examples.

<Example 1> Dataset

The dataset employed in this paper was downloaded from the Harvard Medical School homepage, which can be accessed by (URL:http://med.hardvard.edu/AANLIB/). In total, 160 subject images were downloaded from which 24 image belongs to normal subjects and the remaining 136 image belongs to abnormal subjects. The images are composed of T2-weighted brain MR images of size 256*256 in an axial plane view. Here, T2-weighted images are selected as input because T2-weighted relaxation gives better image contrast, which is helpful to represent different anatomical structures. Also, they are better at detecting lesions than T1-weighted images.

The abnormal subject image belongs to an Alzheimer disease, Alzheimer's disease with visual agnosia, Mild Alzheimer's disease with FDG-PET and MRI, Cerebral Toxoplasmosis disease, chronic subdural hematoma disease, Glioma FDG-PET disease, Glioma TITc-SPECT with a Tour, Glioma TITc-SPECT disease, Huntington's disease, Meningioma disease, Multiple sclerosis disease, Pick's disease, Sarcoma disease and Herpes encephalitis with a Tour disease. The sample of the normal and abnormal brain is shown in FIG. 1. In this experiment, all different types of diseases were grouped in one single group which is called an abnormal group and the task was a binary classification problem, i.e., differentiating normal and abnormal brains.

Moreover, the dataset was divided into 70:30 ratios, where 70% of data were used for a training purpose and the remaining 30% of data was used for a testing purpose. Multi-kernel support vector machine (MK-SVM) was used to classify abnormal vs. normal binary groups. Here, 10-fold stratified cross-validation (SF-CV) technique with a grid search CV was used to find the best optimal hyperparameter for the MK-SVM classifier. We have calculated the performance of our method in terms of accuracy, sensitivity, specificity, precision, f1-score. Moreover, we have also calculated the area under the receiver operating characteristics (AU-ROC) curve for this classification problem with a statistical measurement [44].

<Example 2> Overview of the Proposed Method

The proposed computer-aided diagnosis (CAD) system consists of four processing stages: image pre-processing with a CLAHE [41] technique, feature extraction with combined PDFB-CT [37] and GLCM [43] method, an optimal number of feature subset selection using Probabilistic PCA [39] dimensionality reduction method, and at last classification is applied. FIG. 2 demonstrates the block diagram of the proposed method. At the initial stage, the set of subjects were randomly divided into two groups in (70:30) proportions as a training and testing groups, respectively, before passing them to the MK-SVM classifier. Moreover, in our case, we first passed all 160 subjects from the CLAHE technique which is an image enhancement process. After that, we passed the obtained output of CLAHE to the feature extraction block, where we have extracted 22 texture features with the help of PDFB-CT and GLCM method for each 160 MR brain images. Here, we have used random tree embedding (RTE) [10, 45, 46] technique to transform low dimensional feature into a higher dimensional data, to make sure that all features take part while classifying normal subjects with abnormal ones. Moreover, a feature selection technique using probabilistic-PCA was employed to select the optimal number of subsets of features from the group of 22 features. In the testing stage, a remaining 30% of the dataset is then supplied to the MK-SVM classifier to measure the outcomes of our proposed method.

<Example 3> Pyramdal Directional Filter Blank Contourlet Transform

M. N. Do and M. Vetterli designed the contourlet transform in 2005 [37], which is a novel two-dimensional transform technique for image edge capturing and smooth contour at any orientation. It filters the noises in an image in a better way compared to the wavelet transform. This technique is applied directly from the discrete domain rather than expanding from a continuous domain. CT can apprehend the intrinsic geometrical structure of an original image and it also possesses the significant properties of directionality and anisotropy, where wavelets do not possess this role, so it overtakes wavelet in image processing applications [38]. It provides an efficient multiscale directional representation of an image. Because of its multiscale and directional properties, it can effectively capture the images along one-dimensional contours with a few coefficients. The CT expansion is composed of basic function-oriented at numerous directions in multiple levels, with flexible aspect ratios. In CT there are two important stages, a Laplacian Pyramid (LP) followed by a Directional Filter Bank (DFB). A LP can be described as a data structure composed of bandpass (BP) copies of an image. As a BP filter, pyramid construction tends to enhance image features such as edges, which are vital for image interpretation. The LP has the benefit over the critically sampled WT method that each pyramid level generates only one BP signal, even for multidimensional cases. This characteristic makes it easy to apply on many multiresolution methods using a coarse-to-fine strategy to the LP. The DFB is efficiently applied via an l-level tree-structured allocation that leads to $2^l$ subband with wedge-shaped occurrence partition as illustrated in FIG. 3(b). The wedge-shaped frequency divider of the DFB is then realized by an appropriate grouping of directional frequency piercing by the fan QFB's and the spinning operations done by resampling. This technique avoids the modulation of an input image and it has a simpler rule for increasing the decomposition tree. LP provides a multiresolution system while DFB gives directional nature to the CT. CT use DFB form to get the smooth contours of an image. The LP breakdowns at each-level and generates a downsampled version of the original images, and provides the differences between the original and the estimated resulting of a BP image and then BP images from the Laplacian pyramid are passed into a DFB filter so that directional data can be captured. In this double filter bank, the first LP used to seizure the point discontinuities, and then DFB used to shape those point discontinuities into linear forms. The PDFB combines LP with a DFB. DFB is designed to attain the high-frequency components of an image. Therefore, low-frequency factors are handled poorly by the DFB. Hence, it does provide a sparse representation of an image. To improve this problem, low frequencies should be detached before applying DFB in an image. Therefore, the LP technique is applied first to tackle these difficulties and then its output is sent to the DFB. The LP iteratively allocate a 2D image into bandpass and lowpass sub-bands, and the following BP sub-bands are passed into DFB filter to capture the directional information. FIGS. 3 (a) and (b) show the decomposition form of CT and the frequency spectrum partitioning of DFB, respectively. This method can be iterated repeated on the coarse scales. The last result is decomposed into numerous directional sub-band at multiple scales. This method is flexible since it allows us to pass a different number of directions at each multiple scales. The PDFB-CT uses a tight frame with a frame bounds equal to one when orthogonal filters are used in both LP and the DFB.

Specifically, let $a_0[n]$ be the input image. The output after the LP stage is j BP images $b_j[n]$, j=1, 2, 3, . . . , j (from fine-to-coarse order) and a low-pass image $a_j[n]$. It means that the LP decomposes the $a_{j-1}[n]$ into a coarser image $a_j[n]$ and a fine image $b_j[n]$. Each BP image $b_j[n]$ is further crumbled by an $l_j$-level DFB into $2^{l_j}$ BP directional images $c_{j,k}^{(l,j)}[n]$, k=0, 1, . . . , $2^{l_j}-1$. The discrete CT is a composition of perfect-reconstruction blocks. With an orthogonal filter, the LP consists of a tight frame which is bounded equal to 1, which means that it preserves the $l_2$-norm, or $\|a_o\|_2^2 = \Sigma_{j=1}^J \|b_j\|_2^2 + \|a_j\|_2^2$. Likewise, with orthogonal filters, the DFB is an orthogonal transform, which means $$\|b_j\|_2^2 = \sum\nolimits_{k=0}^{2^{l_j}} \|c_{j,k}^{(l_j)}\|_2^2.$$

Combining these two equations, the DCT satisfies the norm of preserving tight frame conditions. Since the DFB is critically confirmed, the redundancy of the DCT is equal to the excess of the LP, which is;

$$1+\Sigma_{j=1}^J (1/4)^j < 4/3 \qquad \text{[Equation 1]}$$

Now, using a multi-rate identity, the LP band-pass channel resembling the pyramidal level j is approximately corresponding to filtering by a filter size about $C_1 2^j \times C_1 2^j$, trailed by down-sampling by $2^{j-1}$ in each dimensional. For the DFB, from equation (1), we can see that $l_j$ levels ($l_j \geq 2$) the tree-structured method, corresponding to directional filters have the support of breadth about $C_2 2$ and distance about $C_2 2^{l_j-1}$. Combining these two phases, again using multi-rate identities, into corresponding contourlet filter bank cluster, we see that a contourlet basic images have the support of breadth about $C2^j$ and distance about $C2^{j+l_j-2}$. Let $L_p$ and $L_d$ be the number of taps of the pyramidal and directional filters using in the LP and DFB. With a polyphase implementation, the $L_p$ filter bank requires $L_p/2+1$ operation per input instance. Moreover, for an N-pixel image, the intricacy of the $L_p$ stage in the contourlet filter bank is;

$$\sum_{j=1}^{J} N\left(\frac{1}{4}\right)^{j-1}\left(\frac{L_p}{2}+1\right) < \frac{4}{3}N\left(\frac{L_p}{2}+1\right) \text{(operations)} \quad \text{[Equation 2]}$$

And for DFB, the building block of two-channel filter banks needs $L_d$ operations per input example. With an l-level full binary tree breakdown, the complexity of the DFB multiples by 1. This holds because the initial breakdown block in the DFB is trailed by two blocks at half-rate, four blocks at the quarter-rate and so on. Therefore, the complexity of the DFB phase for an N-pixel image is;

$$\sum_{j=1}^{J} N\left(\frac{1}{4}\right)^{j-1} L_d l_j < \frac{4}{3} N \, L_d \max\{l_j\} \text{ (operations)} \quad \text{[Equation 3]}$$

Combining equations 2 and 3, we can obtain the desired PDFB-CT results. Since the multiscale and directional breakdown stages are decoupled in the DCT, now we can have multiple numbers of directions at multiple scales, consequently offering a flexible multiscale and directional growth.

<Example 4> Image Analysis and Feature Extraction

Image pre-processing was performed for all 160 subjects and it is one of the most important steps in image analysis that leads to the improvement of the quality of the images. It has been noticed that some of the images in the selected groups are of a low-contrast in nature. Therefore, to enhance these types of images, a well-known technique was applied which is called contrast limited adaptive histogram equalization (CLAHE) [41, 42]. It is a variant of an adaptive histogram equalization (AHE), which computes numerous histograms, each corresponding to a distinct sector of the image, and uses them to reallocate the lightness values of an image. It is therefore appropriate for improving the local contrast and improving the definitions of edges in each section of an image. However, AHE tends to overamplify the contrast in relatively homogeneous or near-constant areas of the image. Meanwhile, the histogram in such areas is highly concentrated. Thus, AHE may cause noise to be augmented in near-constant regions. So, to prevent overamplify noise we can use CLAHE. CLAHE contrast amplification is partial, to reduce the problem of noise amplification. It utilizes a fixed score of dubbed clip-limit which helps in extracting the histogram before estimating the cumulative distribution function (CDF). CLAHE will redistribute the part of the histogram which had exceeds the clip limit into equal among all histogram bins.

After that, we passed these images through the pyramidal-DFB-contourlet transform for image edge capturing and also to obtain smooth contour at all orientations. In the proposed system, a coefficient of four-level approximation of PDFB-CT of the 'PKVA' filter is used, which is also called a ladder filter is given by [47], and it breakdown the input image into 32 sub-bands as shown below in FIG. 4. The size of top corner contourlet coefficients of the four-level decomposition of an image is about 16*16=256. Moreover, the gained output from the PDFB-CT is then passed through the gray-level co-occurrence matrix [43](GLCM) method to obtain 22 texture features from each MR brain images. The texture feature is a feature that is used to partition images into different regions of interest and to categorize those regions. It offers data in the spatial collection of intensities or colors in an image. GLCM is a statistical-based feature extraction technique. Statistical methods are used to analyze the spatial distribution of gray scores by calculating local features at each section of the image and gaining a set of statistics from the allocation of the local features. This kind of statistical features can be classified into first order (one pixels) and second order (pair of pixels) statistics. Moreover, in our case, we have extracted 22 texture features which are: First order: mean, standard deviation, kurtosis, skewness, RMS, Second order: entropy, contrast, correlation, homogeneity, angular second moment (ASM), dissimilarity, autocorrelation, cluster prominence, cluster shade, cluster tendency, information measure of correlation 1, information measure of correlation 2, difference entropy, sum average, sum entropy, sum variance, variance. First-order statistics describe the statistical moments of the gray-level distribution of an image. These statistical moments depend only on individual pixel values, not on the collaboration or co-occurrence of near pixel values. The following five first-order features are defined as;

a) Mean: It measures the average gray-level of an image, $$\mu = \frac{1}{XYZ}\sum_{k=1}^{X}\sum_{y=1}^{Y}\sum_{z=1}^{Z} I(x, y, z) \quad \text{[Equation 4]}$$

b) Standard deviation (SD): SD measure the degree of deviation among the entire image and the average mean image, $$S = \sqrt{\frac{1}{(XYZ-1)}\sum_{k=1}^{X}\sum_{y=1}^{Y}\sum_{z=1}^{Z}(I(x, y, z) - \mu)^2} \quad \text{[Equation 5]}$$

c) Kurtosis: Kurtosis is a calculation of whether the given data are heavy-tailed or light-tailed comparatively to a normal distribution. That is, data with high kurtosis values tend to have heavy tails or outliers. A dataset with low kurtosis tends to have a lack of outliers and it is defined as, $$\gamma_2 = \frac{1}{XYZ}\sum_{k=1}^{X}\sum_{y=1}^{Y}\sum_{z=1}^{Z}\left\{\left[\frac{I(x, y, z) - \mu}{\sigma}\right]\right\}^4 - 3 \quad \text{[Equation 6]}$$

d) Skewness: Skewness calculates the asymmetry of the datasets around the same sample means. If skewness value is negative, then the data are spread more to the left part of the mean compared to the right and if skewness values are positive, then the dataset is spread more to the right compared to left. The skewness value of the normal distribution (or any flawlessly symmetric distribution) is zero and it is defined as, $$\gamma_1 = \frac{1}{XYZ}\sum_{k=1}^{X}\sum_{y=1}^{Y}\sum_{z=1}^{Z}\left[\frac{I(x, y, z) - \mu}{\sigma}\right]^3 \quad \text{[Equation 7]}$$

e) Root mean square: The RMS is the square root of the average mean of the sum of all pixel values squared. In contrast to the mean, the RMS value is not affected by a pixel value being positive or negative.

$$RMS = \sqrt{\frac{1}{XYZ} \sum_{x=1}^{X} \sum_{y=1}^{Y} \sum_{z=1}^{Z} I(x,y,z)^2} \quad \text{[Equation 8]}$$

The GLCM is a well-known statistical method for extracting second-order texture features from an image. It is represented in a matrix where the number of (columns and rows) is equivalent to the number of individual gray-levels or pixels values in the image of that surface. It describes the frequency of one gray-level showing in a specified spatial linear association with another gray-level inside the area of investigation. Typically, the co-occurrence matrix is calculated based on two parameters; one parameter is the relative distance (between the pixel pair d-measured in pixels) and another one is its relative orientation θ. In our case, we have extracted GLCM based features as described by [43, 48]. Let p(i,j) be the co-occurrence matrix, $N_g$ be the number of discrete intensity levels of the image, μ be the mean of p(i,j), $\mu_x(i)$ and $\mu_y(j)$ be the mean of row (i) and column (j), $\sigma_x(j)$ and $\sigma_y(j)$ be the standard deviation of row (i) and column (j), and some important notations for the calculation of below equations;

$$p_x(i) = \sum_{j=1}^{N_g} p(i,j) \, p_y(i) = \sum_{i=1}^{N_g} p(i,j) \quad \text{[Equation 9]}$$

$$p_{x+y}(k) = \sum_{i=1}^{N_g} \sum_{j=1}^{N_g} p(i,j) \, i+j=k, (k=2,3,\ldots,2N_g), p_{x-y}(k) = \sum_{i=1}^{N_g} \sum_{j=1}^{N_g} p(i,j) |i-j|=k, (k=0,1,\ldots,N_g-1) \quad \text{[Equation 10]}$$

$$HXY1 = -\sum_{i=1}^{N_g} \sum_{j=1}^{N_g} p(i,j) \log(p_x(i) p_y(j)), HXY2 = -\sum_{i=1}^{N_g} \sum_{j=1}^{N_g} p_x(i) p_y(j) \log(p_x(i) p_y(j)) \quad \text{[Equation 11]}$$

f) Entropy: Entropy is designed to describe the randomness of the textural image and it is defined as, $$\text{Entropy} = -\sum_{i=1}^{N_g} \sum_{j=1}^{N_g} p(i,j) \log_2[p(i,j)] \quad \text{[Equation 12]}$$

g) Contrast: Contrast compute the intensity of a pixel and its neighbor over the input image, and it is defined as, $$\text{Contrast} = \sum_{i=1}^{N_g} \sum_{j=1}^{N_g} |i-j|^2 p(i,j) \quad \text{[Equation 13]}$$

h) Correlation (COR): The Correlation texture measure the spatial or linear dependence of grey-levels on those of adjoining pixels, $$\text{Correlation} = \frac{\sum_{i=1}^{N_g} \sum_{j=1}^{N_g} ij P(i,j) - \mu_i(j)\mu_j(j)}{\sigma_x(j)\sigma_y(j)} \quad \text{[Equation 14]}$$

i) Homogeneity (HO): Homogeneity measures the local homogeneity of an image. It is high when their local gray level is uniform and when its inverse GLCM is high. It may have a single or a range of values to find whether the provided image is textured or non-textured and it is defined as, $$\text{Homogenity} = \sum_{i=1}^{N_g} \sum_{j=1}^{N_g} \frac{p(i,j)}{1+|i-j|} \quad \text{[Equation 15]}$$

j) Angular second moment (ASM): ASM also means uniformity. The more homogeneous the image is, the larger the score. When energy equals to one, the image is supposed to be a constant image, $$ASM = \sum_{i=1}^{N_g} \sum_{j=1}^{N_g} p(i,j)^2 \quad \text{[Equation 16]}$$

k) Dissimilarity (DS): It is a textural property of the image which is computed by considering the arrangement of an image as measured in terms of an angle and it is defined as, $$\text{Dissimilarity} = \sum_{i=1}^{N_g} \sum_{j=1}^{N_g} p(i,j) |i-j| \quad \text{[Equation 17]}$$

l) Autocorrelation (ACOR): It measures the coarseness of an image and evaluates the linear spatial relationships between texture primitives.

$$\text{Autocorrelation} = \sum_{i=1}^{N_g} \sum_{j=1}^{N_g} ij p(i,j) \quad \text{[Equation 18]}$$

m) Cluster Prominence (CP): It measures local intensity variation and as well as asymmetry of the GLCM.

$$CP = \sum_{i=1}^{N_g} \sum_{j=1}^{N_g} [i+j-\mu_x(i)-\mu_y(j)]^4 p(i,j) \quad \text{[Equation 19]}$$

n) Cluster shade (CS): It measures the skewness of the GLCM matrix and believed to gauge the perceptual ideas of uniformity.

$$CS = \sum_{i=1}^{N_g} \sum_{j=1}^{N_g} [i+j-\mu_x(i)-\mu_y(j)]^3 p(i,j) \quad \text{[Equation 20]}$$

o) Cluster tendency (CT): It is a measure of groupings of pixels with similar gray-level scores.

$$CT = \sum_{i=1}^{N_g} \sum_{j=1}^{N_g} [i+j-\mu_x(i)-\mu_y(j)]^2 p(i,j) \quad \text{[Equation 20]}$$

p) Difference entropy (DE): DE measures the disorder related to the gray-level difference distribution of the image.

$$\text{difference entropy} = \sum_{i=0}^{N_g-1} p_{x-y}(i) \log_2[p_{x-y}(i)] \quad \text{[Equation 22]}$$

q) Information measure of correlation 1 (IMC1):

$$IMC1 = \frac{H - HXY1}{\max\{HX, HY\}}, \quad \text{[Equation 23]}$$

where H is the entropy.

r) Information measure of correlation 2 (IMC2):

$$IMC2 = \sqrt{1 - e^{-2(HXY2-H)}} \text{ where H is the entropy [Equation 24]}$$

, where H is the entropy.

s) Sum average (SA): It measures the mean of the gray-level sum distribution of the image.

$$SA = \sum_{i=2}^{2N_g} [i p_{x+y}(i)] \quad \text{[Equation 25]}$$

t) Sum entropy (SE): It measures the disorder related to the gray-level sum distribution of the image.

$$SE = -\sum_{i=2}^{2N_g} p_{x+y}(i) \log_2[p_{x+y}(i)] \quad \text{[Equation 26]}$$

u) Sum variance (SV): It measures the dispersion (about the mean) of the gray-level sum distribution of the image.

$$SV = \sum_{i=2}^{2N_g} (i-SE)^2 p_{x+y}(i) \quad \text{[Equation 27]}$$

v) Variance (V): It is a measure of the dispersal of the values around the mean.

$$\text{Variance} = \sum_{i=1}^{N_g} \sum_{j=1}^{N_g} (i-\mu)^2 p(i,j) \quad \text{[Equation 28]}$$

The extracted 22 texture feature from each 160 MR brain images are show n in FIG. 5(b), where each row represents one subject and 22-columns represent 22 texture features for 1 subject. Likewise, in the first figure of 5(a), the blue color represents a normal brain dataset (which is 24) while the yellow color represents an abnormal dataset (which is 136).

Figure 7:
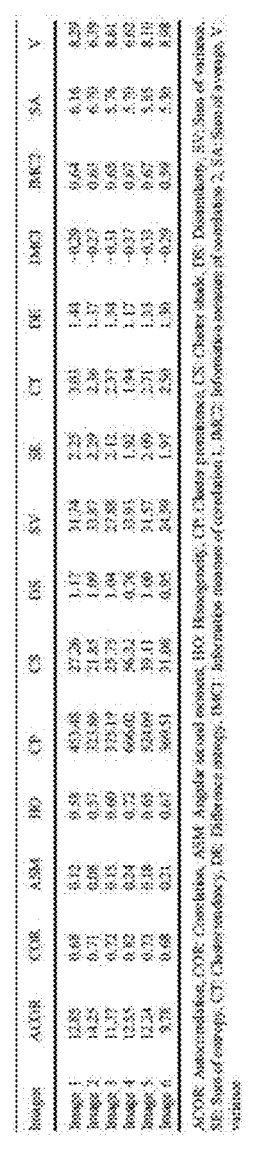

In these experiments, FIG. 6 shows the first-order statistical features for the first six-images and FIG. 7 shows the second-order texture features for the same images.

<Example 5> Feature Selection

For each subject, 22 texture features were extracted as illustrated in the earlier section. Some of these attributes may not be relevant or important to some of the pathological changes stirring in abnormal subjects and therefore they do not provide valuable information for the binary classification task. Moreover, to train more efficient classifiers, these features should be removed. However, it does not essentially mean that an attribute that captures the pathological alternations of abnormal subjects is always useful for binary classification. Therefore, it is essential to apply a suitable feature selection method to select those discriminative attributes which show differences among both classes. This step helps to pace up the classification process by lessening computational time for the testing and training dataset and increase the performance of classification accuracy. At first, we normalized the extracted attributes using the standard scalar utility from Scikit-learn (0.19.2) [49], which transforms the attributes in such a way that its allocation will have an average mean of zero and SD of one to reduce the dependency and redundancy of the data. Later, we have employed high dimensional data transformation using random tree embedding (RTE) [10, 45, 46] from Scikit-learn (0.19.2) [49] and a dimensionality reduction process using probabilistic principal component analysis (PPCA) method. RTE method works based on the principle of decision tree ensemble learning technique that executes an unsupervised data transformation algorithm to solve an RTE task. It uses a forest-like structure of complete random trees, which encodes in the data by following the method of indices of the leaves, where a data example point ends up. Moreover, the obtained indexed is then prearranged in a one-of-k encoder, which later maps the feature vector into a very high-dimensional shape which might be helpful for the classification process. After mapping the feature vector into the very high-dimensional shape, then we have applied PPCA method for dimensionality reduction purposes, which only picks the important attributes from the bunch of 22 features. PPCA is a probabilistic formulation of PCA founded on a Gaussian latent variable factor and was first introduced by [39]. PPCA reduces high-dimensional feature vector to a lower dimensional representation by relating the p-dimensional observed input data point to an equivalent q-dimensional latent variable around a linear transformation function, where q<<p. Let $x_i=(x_{i1}, x_{i2}, \ldots, x_{ip})^T$ be an observed set of variables for observation i and $z_i=(z_{i1}, z_{i2}, \ldots, z^{ip})^T$ be a latent variable resembling to observation i in the latent, which have a reduced dimension space. Moreover, PPCA relies on an isotropic error model. PPCA model can be expressed as follows, $$x_i = W z^{*T} + \mu + o\epsilon \quad \text{[Equation 29]}$$

Where $x_i \in \mathbb{R}^p$, $\epsilon \sim \mathcal{N}(0, I_p)$, $z \sim \mathcal{N}(0, I_q)$ and $z \perp \epsilon$, $z_i \in \mathbb{R}^q$ is a latent variable and W is a p*q loading matrix. The error term, $\epsilon$, is a Gaussian value with zero mean and its covariance as v*I (k), where v is called a residual variance. To ensure that the residual variance is greater than zero, the value of k must be smaller than the rank. The standard principle component where v equals zero is the limiting condition for PPCA. The observed variables x is considered to be independent of the given values of a latent variable z. Therefore, the correlation between the observed variables elucidated by the latent variables and their error justifies the unique variability relative to $x_i$. The dimension of the matrix W is p*k, which relates both the latent and observed variables. The vector μ allows the model to have a non-zero mean. PPCA considered the values as missing and arbitrary over the dataset. Based on this model, $$x_i \sim N(\mu, W^* W^T + v^* I(k)) \quad \text{[Equation 30]}$$

Given that, the solution for W and v cannot be determined analytically. We use the EM algorithm iteratively to maximize the corresponding log-likelihood function. For missing values, the EM procedure considers an additional latent variable. At convergence, the columns of W span the solution sub-space. PPCA then yields the orthonormal coefficients. In this way, we can perform the PPCA method on the training and testing dataset.

<Example 6> MultipleKernel-Support Vector Machine (MK-SVM)

MK-SVM [44] is a supervised learning method. It is a discriminative classifier formally defined by separating hyperplane. In other words, given the labeled training sample, the algorithm outputs an optimal hyperplane score that categorizes new testing samples. Recently, it has been utilized in numerous neuroimaging research [8, 10, 16, 18, 25, 30, 32] and is realized as one of the most effective machine learning tools in the neuroscience field. For a linearly distinguishable set of 2D-points that belongs to one of two classes, we have to find a best separating straight line. FIG. 8 shows the sample of training feature vectors from two classes, which are represented by X and O in the feature space. In FIG. 8, we can observe that there exist several lines that propose a solution to this problem. As theory says, a line is terrible if it passes too close the points, because in nature, these lines are sensitive to noise, and then it will not generalize the point correctly. Therefore, its goal is to find the line which is passing as far as likely from all points. At that moment, the operation of the SVM procedure is based on finding the optimal hyperplane that provides the largest least distance to the training instances. Twice, this obtained distance receives the significant name of margin inside an SVM's theory. Therefore, the optimal splitting hyperplane exploits the margin of the training samples.

The equation of a line is y=ax+b. By renaming x with $x_1$ and y with $x_2$, the equation will change to $a(x_1-x_2)+b=0$. If we stipulate $X=(x_1,x_2)$ and w=(a,−1), we get w.x+b=0, which is an equation of hyperplane. Now, the linearly separable of 2D-points with the optimal hyperplane equation has the following structure;

$$f(x) = \beta_0 + \beta^T \varnothing(x) \quad \text{[Equation 31]}$$

Where x is an input vector, β is known as the weight vector, $\beta^T$ is a hyperplane parameter, $\beta_0$ as the bias, and Ø.(x) is a function that is used to map feature vector x into a higher dimensional space. The optimal hyperplane can be characterized in an infinite number of several ways by scaling β and $\beta_0$. As a matter of agreement, among all the possible representation of the hyperplane, the one chosen is;

$$|\beta_0 + \beta^T \varnothing(x)| = 1 \quad \text{[Equation 32]}$$

Where x symbolizes the training samples closest to the hyperplane. As a whole, the training samples that are closest to the subspace or hyperplane are called a support vector.

This illustration is known as the canonical hyperplane. For a given decision surface which is described with the equation;

$$\beta_0 + \beta^T \varnothing.(x) = 0, \text{ which is same as } \beta^T \varnothing.(x) \quad \text{[Equation 33]}$$

And, for a vector y that does not belong to the subspace, the following equation is satisfied [44];

$$\beta_0 + \beta^T \varnothing.(y) = \pm d \|\beta\| \quad \text{[Equation 34]}$$

Where d is the distance of a point y to the given optimal hyperplane. The different signs determine the vector's y side of the hyperplane. Therefore, the output f(x) of the SVM is indeed proportional to the norm of support vector β and the distance d(y) from the chosen hyperplane. Moreover, in our study, we have used multi-kernel-SVM, which is used to resolve the non-linear difficulty with the use of linear-SVM classifiers and involved in swapping linearly non-separable sample into a linearly separable sample. The idea behind this notion is that linearly non-separated samples in n-dimensional space could be linearly distinguishable in higher m-dimensional space. In this study, we have used MK-SVM from Scikit-learn (0.19.2) [49] library. The Scikit-learn library internally uses LIBSVM [50] to handle all computations. The hyperparameter of the MK-SVM must be altered to measure how much maximum estimated performance can be achieved by tuning it. Consequently, to find an optimal hyperplane parameter for the multi-kernel based SVM, C (is the penalty parameter, which represents misclassification or error term. The misclassification or error term tells the SVM optimization of how much error is bearable. This is how you can control the trade-off between decision boundary and misclassification term) and $\gamma$ (It defines how far influences the calculation of plausible line of separation) parameters are optimized using grid search with ten-fold stratified cross-validation (SF-CV) method on the training dataset. CV is the classical approach to maintain the individuality of the training dataset (used for fitting the model) and the testing dataset (used to evaluate the performance), was performed. The CV technique involves two nested loops: an outer loop assessing the classification performance measure and an inner loop used to adjust the hyperparameters of the model (c and $\gamma$ for MK-SVM). It is important to note that the benefit of using an inner loop CV is significant, it helps to avoid biasing performances rising when optimizing the hyperparameters. Furthermore, CV works by randomly separating the training samples into 10 equal parts, one part of which was assigned as a validation sample, while the remaining nine parts were used by a training sample. In this study, a ten-fold stratified CV was operated 100 times to attain more accurate fallouts. Finally, we have calculated the arithmetic mean of the 100 replications as the final result. Furthermore, the number of selected attributes is small, in our situation the RBF kernel accomplishes better results than other kernels.

<Example 7> Performance Evaluation Metrics

There are numerous ways to calculate the efficiency of the classifiers, in our case, we have calculated the confusion matrix, which evaluates the accuracy of classification. FIG. 9 displays a confusion matrix for binary image classification, where TN and FN represent true negative and false negative likewise TP, and FP represent true positive and false positive. Here, in our case, abnormal is expected to hold the value of "true" and normal ones are expected to hold the value of "false" for subsequent normal convection. In total we have calculated five performance measures based on confusion matrix values, they are accuracy, sensitivity, specificity, precision, f1-score. These metrics can be used for any classification process with a binary output, that is, two classes.

If we considered two classes of MR brain images, normal and abnormal, and considered finding evidence of abnormal disease as the favorable condition, then, we have these definitions;

True Positive(TP): Abnormal images classified as abnormal
False Positive(FP): Normal images classified as abnormal
True Negative(TN): Normal images classified as normal.
False Negative(FN): Abnormal images classified as normal.

Now, we formulate accuracy, specificity, sensitivity, precision, and f1-score as follows:

$$\text{Accuracy} = (TP + TN) / (TP + TN + FP + FN) \quad \text{[Equation 35]}$$

$$\text{Recall} = \text{Sensitivity} = TP / (TP + FN) \quad \text{[Equation 36]}$$

$$\text{Specificity} = TN / (TN + FP) \quad \text{[Equation 37]}$$

$$\text{Precision} = TP / (TP + FP) \quad \text{[Equation 38]}$$

$$F1 - \text{score} = 2 \times \left[ \frac{\text{precision} \times \text{recall}}{\text{precision} + \text{recall}} \right] \quad \text{[Equation 39]}$$

Here, recall or sensitivity can be stated as the proportion of the whole number of accurately classified positive samples divides to the whole number of positive examples. To get the score of precision, we split the total number of accurately classified positive instances by the total number of predicted positive examples. F1-score is an amount related to a test's accuracy. Also, the area under the receiver operating characteristics curve (AU-ROC) [51] was computed as another performance measure for this binary classification problem. In contrary to accuracy, AU-ROC measurement does not need a threshold on the classifier's output probabilities and so it does not depend on the class priors. Likewise, we have also calculated Cohen's kappa [52] score for this classification problem. The kappa statistic score is always between −1 and 1. The maximum score means the perfect agreement between two clusters, zero or lower score means a low probability of accord. To evaluate all these above-stated performance measures, a 10-fold SF-CV was carried out. And then, the reported results are the average over 100 runs.

<Example 8> Result and Discussion

The proposed method was implemented on Ubuntu 16.04 LTS, running Matlab (R2019b) toolbox, python 3.5, and using the Scikit-learn public library version (0.19.2) [49]. In this study, there were two classes of data, normal and abnormal. At first, we have passed all these images from the CLAHE image processing function to enhance the quality of an image, the enhanced image can be seen in FIG. 1. After that, the obtain preprocessed output from the CLAHE is passed to the coefficients of four-level (the 4-levels of pyramidal decomposition and the numbers directional decomposition at each pyramidal level's (from coarse to fine) are: 0,3,3, and 4) approximation sub-band of pyramidal DFB contourlet transform function for image edge capturing and also to obtain smooth contour at all orientation. The input image is breakdowns into 32 directional sub-band images at the finest pyramidal level as shown in FIG. 4. Here, we have passed the finest pyramid level {(1,5) (1,1)} to the GLCM function to obtain 22 texture features from each MR brain images. The 22 selected texture features were namely: First order: mean, standard deviation, kurtosis, skewness, RMS, Second-order: entropy, contrast, correlation, homogeneity, angular second moment (ASM), dissimilarity, autocorrelation, cluster prominence, cluster shade, cluster tendency, information measure of correlation 1, information measure of correlation 2, difference entropy, sum average, sum entropy, sum variance, variance. Likewise, later we have passed all these 22 extracted features from GLCM function to the normalization function to rescale the value of its numeric attribute into the range 0 and 1. It helps to reduce data redundancy. Moreover, we have applied an RTE technique that transformed obtained low dimensional features into a higher dimensional state. Additionally, we have also utilized a feature selection method using a probabilistic PCA dimensionality reduction method, which will only select the effective features from the bunch of 22 features and send these picked features to the classifier, to compute the performance of classifying abnormal vs. normal group. In our case, we used an MK-SVM as a classifier from a Scikit-learn library (0.19.2). Furthermore, to attain unbiased estimations of performance, the set of datasets were randomly divided into two sets in 70:30 ratios as a training and a testing set, respectively. In the training set, to attain the right values for the hyperparameters (c and $\gamma$) is very difficult, and their value can influence the classification result. Therefore, to acquire the optimal hyperparameter values for the MK-SVM, we have used grid search (grid search is a method to find optimal hyperparameter that will systematically build and assess a model for each arrangement of algorithm parameters stated in a grid) with a 10-fold SK-CV on the training set. The grid search method was performed over the ranges of c=1 to 9 and $\gamma$=1e–4 to 1. For each technique, the gained optimized score of the hyperparameter was then utilized to train the classifier using the training group, and later the outcomes of the resulting MK-SVM classifier was then evaluated on the remaining 30% of the sample in the testing group, which was not applied during the training phase. The gained optimized hyperparameter score and their best CV score are shown in FIG. 10.

FIG. 11 represents the graph of the classifier's CV score (c and $\gamma$) for abnormal vs. normal group. In FIG. 11, we can see the influence of having different c and $\gamma$ scores on the model. Furthermore, the best attained optimal hyperparameter combination for an abnormal vs. normal are C=9, $\gamma$=0.001 these tuned optimal hyperparameter values are automatically selected from the given range of C=1 to 9 and $\gamma$=1e–4 to 1 with the help of grid search and 10-fold SF-CV. In this way, we attained unbiased estimations of the performance for this binary classification problem.

In our research, the number of participants was not identical in each group. Hence, only calculating accuracy does not allow a comparison of the performances between two available classes. Thus, we have considered six measures. For each sample, we have computed the accuracy, specificity, sensitivity, precision, F1-score, and AU-ROC performance measure values. Moreover, we have also computed Cohen's kappa value for these classification problems. FIG. 12 shows the classification results for abnormal vs. normal.

Our proposed method has achieved 100% of AUC, 100% accuracy, 100% of sensitivity, 98.24% of specificity, 97% of precision, and 98.71% of f1-score. Furthermore, Cohen's kappa value is 0.9763 for the (PDFB-CT+GLCM+PPCA+MK-SVM) method, which is very close to 1. Likewise, we have also calculated the 2D-DWT coefficient at four-level approximation, and the achieved performance outcomes for (DWT+GLCM+PPCA+MK-SVM) are 98.75% of AUC, 97.92% of accuracy, 100% of sensitivity, 97.56% of specificity, 95.5% of precision, 93.33% of f1-score, and 0.9211 Cohen's kappa score. Moreover, the higher the value of sensitivity of a CAD scheme, the better the outcomes of the CAD scheme. Thus, the proposed (PDFB-CT+GLCM+PPCA+MK-SVM) model holds greater potential in predicting correct clinical decisions. FIG. 8 shows the AU-ROC curve between abnormal and normal patients. Further, in order to back the effectiveness of PDFB-CT features over 2D-DWT wavelet features, we have conducted a test on 2D-DWT features in the proposed scheme and the results are reported in Table 6. It may be observed that the proposed system with PDFB-CT features has achieved better performance above the 2D-DWT feature. Here, the 2D-DWT features are obtained from all of the coefficients of 4-level sub-bands decomposition. The total AU-ROC curve is a single index for computing the performance of testing samples. The larger the value of an AUC, the better is the general performance of the pathological test to correctly choice up abnormal and normal subjects. For the PDFB-CT+GLCM+PPCA+MK-SVM method, our proposed method has achieved 100% AUC, exposing that our proposed model has performed very well when differentiating positive and negative scores. Likewise, for DWT+GLCM+PPCA+MK-SVM, we have achieved 98.75% of AUC which is a little bit low compared to for PDFB-CT+GLCM+PPCA+MK-SVM method. PDFB-CT+GLCM+PPCA+MK-SVM method has performed very well and its likelihoods for the positive samples are well divided from those of the negative samples. Here, now it can be concluded that using PDFB features the proposed technique brings significant improvements in the performance.

<Example 9> Conclusion

In this paper, an improved automated framework has been proposed to classify abnormal group with normal ones using the combination of pyramidal directional filter bank contourlet transform and gray level co-occurrence matrix, and later the performance was a measure on binary classification with the help of multi-kernel support vector machine with a 10-fold stratified CV technique. In total, we have extracted 22 (first and second-order) features from the GLCM function. Moreover, in our case, we have used a grid search method with 10-fold SF-CV to find the optimal hyperparameter value for the MK-SVM classifier. Later, we passed these obtained best hyperparameter values to the MK-SVM classifier for a classification purpose. Our proposed method (PDFB-CT+GLCM+PPCA+MK-SVM) has achieved 100% of AU-ROC, 100% accuracy, and 100% of sensitivity which is very high compared to DWT+GLCM+PPCA+MK-SVM method. Likewise, our proposed method has achieved 0.9763 Cohen's kappa score which is very near to 1, hence it represents that the PDFB-CT+GLCM+PPCA+MK-SVM method has achieved a high level of agreement between abnormal vs. normal group compared to DWT+GLCM+PPCA+MK-SVM method (which achieved 0.9211 kappa score).

REFERENCE

1. Chaplot S, Patnaik L M, Jagannathan N R (2006) Classification of magnetic resonance brain images using 1. wavelets as input to support vector machine and neural network. Biomedical Signal Processing and Control 1:86-92. https://doi.org/10.1016/j.bspc.2006.05.002
2. El-Dahshan E-SA, Hosny T, Salem A-BM (2010) Hybrid intelligent techniques for MRI brain images classification. Digital Signal Processing 20:433-441. https://doi.org/10.1016/j.dsp.2009.07.002
3. Jha D, Kim J-I, Lee B, Kwon G-R (2017) Efficient Cascade Model for Pathological Brain Image Detection by Magnetic Resonance Imaging. Journal of Medical Imaging and Health Informatics 7:1744-1752. https://doi.org/10.1166/jmihi.2017.2269
4. Nayak D R, Dash R, Majhi B (2016) Brain MR image classification using two-dimensional discrete wavelet transform and AdaBoost with random forests. Neurocomputing 177:188-197. https://doi.org/10.1016/j.neucom.2015.11.034
5. Zhang Y, Wu L, Wang S (2011) Magnetic resonance brain image classification by an improved artificial bee colony algorithm. Progress In Electromagnetics Research 116:65-79. https://doi.org/10.2528/PIER11031709
6. Zhang Y, Dong Z, Wu L, Wang S (2011) A hybrid method for MRI brain image classification. Expert Systems with Applications 38:10049-10053. https://doi.org/10.1016/j.eswa.2011.02.012
7. Saritha M, Paul Joseph K, Mathew A T (2013) Classification of MRI brain images using combined wavelet entropy based spider web plots and probabilistic neural network. Pattern Recognition Letters 34:2151-2156. https://doi.org/10.1016/j.patrec.2013.08.017
8. Gupta Y, Lee K H, Choi K Y, et al (2019) Early diagnosis of Alzheimer's disease using combined features from voxel-based morphometry and cortical, subcortical, and hippocampus regions of MRI T1 brain images. PLoS ONE 14:e0222446. https://doi.org/10.1371/journal.pone.0222446
9. Gupta Y, Lee K H, Choi K Y, et al (2019) Alzheimer's Disease Diagnosis Based on Cortical and Subcortical Features. Journal of Healthcare Engineering 2019:1-13. https://doi.org/10.1155/2019/2492719
10. Gupta Y, Lama R K, Kwon G-R, Alzheimer's Disease Neuroimaging Initiative (2019) Prediction and Classification of Alzheimer's Disease Based on Combined Features From Apolipoprotein-E Genotype, Cerebrospinal Fluid, MR, and FDG-PET Imaging Biomarkers. Front Comput Neurosci 13:72. https://doi.org/10.3389/fncom.2019.00072
11. Alam S, Kwon G-R, The Alzheimer's Disease Neuroimaging Initiative (2017) Alzheimer disease classification using KPCA, LDA, and multi-kernel learning SVM: ALAN et al. International Journal of Imaging Systems and Technology 27:133-143. https://doi.org/10.1002/ima.22217
12. Farzan A, Mashohor S, Ramli A R, Mahmud R (2015) Boosting diagnosis accuracy of Alzheimer's disease using high dimensional recognition of longitudinal brain atrophy patterns. Behavioural Brain Research 290:124-130. https://doi.org/10.1016/j.bbr.2015.04.010
13. Harikumar R, Vinoth kunar B (2015) Performance analysis of neural networks for classification of medical images with wavelets as a feature extractor. International Journal of Imaging Systems and Technology 25:33-40. https://doi.org/10.1002/ima.22118
14. Kalbkhani H, Shayesteh M G, Zali-Vargahan B (2013) Robust algorithm for brain magnetic resonance image (MRI) classification based on GARCH variances series. Biomedical Signal Processing and Control 8:909-919. https://doi.org/10.1016/j.bspc.2013.09.001
15. Nayak D R, Dash R, Majhi B, Prasad V (2017) Automated pathological brain detection system: A fast discrete curvelet transform and probabilistic neural network based approach. Expert Systems with Applications 88:152-164. https://doi.org/10.1016/j.eswa.2017.06.038
16. Nayak D R, Dash R, Majhi B (2018) Pathological brain detection using curvelet features and least squares SVM. Multimedia Tools and Applications 77:3833-3856. https://doi.org/10.1007/s11042-016-4171-y
17. Nayak D R, Dash R, Majhi B (2018) Discrete ripplet-II transform and modified PSO based improved evolutionary extreme learning machine for pathological brain detection. Neurocomputing 282:232-247. https://doi.org/10.1016/j.neucom.2017.12.030
18. Nayak D R, Das D, Dash R, et al (2019) Deep extreme learning machine with leaky rectified linear unit for multiclass classification of pathological brain images. Multimedia Tools and Applications. https://doi.org/10.1007/s11042-019-7233-0
19. Yang G, Zhang Y, Yang J, et al (2016) Automated classification of brain images using wavelet-energy and biogeography-based optimization. Multimedia Tools and Applications 75:15601-15617. https://doi.org/10.1007/s11042-015-2649-7
20. Wang S, Zhang Y, Dong Z, et al (2015) Feed-forward neural network optimized by hybridization of PSO and ABC for abnormal brain detection. International Journal of Imaging Systems and Technology 25:153-164. https://doi.org/10.1002/ima.22132
21. Wang S, Phillips P, Yang J, et al (2016) Magnetic resonance brain classification by a novel binary particle swarm optimization with mutation and time-varying acceleration coefficients. Biomedical Engineering/Biomedizinische Technik 61:431-441. https://doi.org/10.1515/bmt-2015-0152
22. Zhang Y, Wang S, Wu L (2010) A novel method for magnetic resonance brain image classification based on adaptive chaotic PSO. PIER 109:325-343. https://doi.org/10.2528/PIER10090105
23. Zhang Y, Wu L (2012) An MR brain images classifier via principal component analysis and kernel support vector machine. Progress In Electromagnetics Research 130:369-388. https://doi.org/10.2528/PIER12061410
24. Zhang Y, Wang S, Ji G, Dong Z (2013) An MR Brain Images Classifier System via Particle Swarm Optimization and Kernel Support Vector Machine. The Scientific World Journal 2013:1-9. https://doi.org/10.1155/2013/130134
25. El-Dahshan E-SA, Mohsen H M, Revett K, Salem A-BM (2014) Computer-aided diagnosis of human brain tumor through MRI: A survey and a new algorithm. Expert Systems with Applications 41:5526-5545. https://doi.org/10.1016/j.eswa.2014.01.021
26. Zhou X, Wang S, Xu W, et al (2015) Detection of Pathological Brain in MRI Scanning Based on Wavelet-Entropy and Naive Bayes Classifier. In: Ortuño F, Rojas I (eds) Bioinformatics and Biomedical Engineering. Springer International Publishing, Cham, pp 201-209
27. Zhang Y-D, Chen S, Wang S-H, et al (2015) Magnetic Resonance Brain Image Classification Based on Weighted-Type Fractional Fourier Transform and Nonparallel Support Vector Machine. International Journal of Imaging Systems and Technology 25:317-327. https://doi.org/10.1002/ima.22144

28. Zhang Y-D, Wang S-H, Yang X-J, et al (2015) Pathological brain detection in MRI scanning by wavelet packet Tsallis entropy and fuzzy support vector machine. SpringerPlus 4: https://doi.org/10.1186/s40064-015-1523-4
29. Zhang Y, Dong Z, Wang S, et al (2015) Preclinical Diagnosis of Magnetic Resonance (MR) Brain Images via Discrete Wavelet Packet Transform with Tsallis Entropy and Generalized Eigenvalue Proximal Support Vector Machine (GEPSVM). Entropy 17:1795-1813. https://doi.org/10.3390/e17041795
30. Zhang Y-D, Chen X-Q, Zhan T-M, et al (2016) Fractal Dimension Estimation for Developing Pathological Brain Detection System Based on Minkowski-Bouligand Method. IEEE Access 4:5937-5947. https://doi.org/10.1109/ACCESS.2016.2611530
31. Zhang Y, Ji G, Yang J, et al (2016) Preliminary research on abnormal brain detection by wavelet-energy and quantum-behaved PSO. Technology and Health Care 24:S641-S649. https://doi.org/10.3233/THC-161191
32. Zhang Y-D, Zhao G, Sun J, et al (2018) Smart pathological brain detection by synthetic minority oversampling technique, extreme learning machine, and Jaya algorithm. Multimed Tools Appl 77:22629-22648. https://doi.org/10.1007/s11042-017-5023-0
33. Wang S, Du S, Atangana A, et al (2018) Application of stationary wavelet entropy in pathological brain detection. Multimed Tools Appl 77:3701-3714. https://doi.org/10.1007/s11042-016-3401-7
34. Gudigar A, Raghavendra U, San T R, et al (2019) Application of multiresolution analysis for automated detection of brain abnormality using MR images: A comparative study. Future Generation Computer Systems 90:359-367. https://doi.org/10.1016/j.future.2018.08.008
35. Nayak D R, Dash R, Majhi B, Acharya UR (2019) Application of fast curvelet Tsallis entropy and kernel random vector functional link network for automated detection of multiclass brain abnormalities. Computerized Medical Imaging and Graphics 77:101656. https://doi.org/10.1016/j.compmedimag.2019.101656
36. Gudigar A, Raghavendra U, Ciaccio E J, et al (2019) Automated Categorization of Multi-Class Brain Abnormalities Using Decomposition Techniques With MRI Images: A Comparative Study. IEEE Access 7:28498-28509. https://doi.org/10.1109/ACCESS.2019.2901055
37. Do M N, Vetterli M (2005) The contourlet transform: an efficient directional multiresolution image representation. IEEE Transactions on Image Processing 14:2091-2106. https://doi.org/10.1109/TIP.2005.859376
38. Ghannam S, Abou-Chadi F E Z (2009) Contourlet versus Wavelet Transform: A performance study for a robust image watermarking. In: 2009 Second International Conference on the Applications of Digital Information and Web Technologies. IEEE, London, United Kingdom, pp 545-550
39. Tipping M E, Bishop C M Probabilistic Principal Component Analysis. 13
40. Chen T, Martin E, Montague G (2009) Robust probabilistic PCA with missing data and contribution analysis for outlier detection. Computational Statistics & Data Analysis 53:3706-3716. https://doi.org/10.1016/j.csda.2009.03.014
41. Pizer S M, Johnston R E, Ericksen J P, et al (1990) Contrast-limited adaptive histogram equalization: speed and effectiveness. In: [1990] Proceedings of the First Conference on Visualization in Biomedical Computing. IEEE Comput. Soc. Press, Atlanta, GA, USA, pp 337-345
42. Pisano E D, Zong S, Hemminger B M, et al (1998) Contrast Limited Adaptive Histogram Equalization image processing to improve the detection of simulated spiculations in dense mammograms. Journal of Digital Imaging 11:193-200. https://doi.org/10.1007/BF03178082
43. Haralick R M, Shanmugam K, Dinstein I (1973) Textural Features for Image Classification. IEEE Transactions on Systems, Man, and Cybernetics SMC-3:610-621. https://doi.org/10.1109/TSMC.1973.4309314
44. Cortes C, Vapnik V (1995) Support-vector networks. Machine Learning 20:273-297. https://doi.org/10.1007/BF00994018
45. Geurts P, Ernst D, Wehenkel L (2006) Extremely randomized trees. Mach Learn 63:3-42. https://doi.org/10.1007/s10994-006-6226-1
46. Moosmann F, Nowak E, Jurie F (2008) Randomized Clustering Forests for Image Classification. IEEE Trans Pattern Anal Mach Intell 30:1632-1646. https://doi.org/10.1109/TPAMI.2007.70822
47. See-May Phoong, Kim C W, Vaidyanathan P P, Ansari R (1995) A new class of two-channel biorthogonal filter banks and wavelet bases. IEEE Transactions on Signal Processing 43:649-665. https://doi.org/10.1109/78.370620
48. Löfstedt T, Brynolfsson P, Asklund T, et al (2019) Gray-level invariant Haralick texture features. PLoS ONE 14:e0212110. https://doi.org/10.1371/journal.pone.0212110
49. Pedregosa F, Varoquaux G, Gramfort A, et al Scikit-learn: Machine Learning in Python. MACHINE LEARNING IN PYTHON 6
50. Chang C-C, Lin C-J (2011) LIBSVM: A library for support vector machines. ACM Trans Intell Syst Technol 2:1-27. https://doi.org/10.1145/1961189.1961199
51. Greiner M, Pfeiffer D, Smith R D (2000) Principles and practical application of the receiver-operating characteristic analysis for diagnostic tests. Preventive Veterinary Medicine 45:23-41. https://doi.org/10.1016/S0167-5877(00)00115-X
52. Cohen J (1960) A Coefficient of Agreement for Nominal Scales. Educational and Psychological Measurement 20:37-46. https://doi.org/10.1177/001316446002000104

What is claimed is:

1. A method of providing diagnostic information on brain disease classification, comprising the steps of
   1) image input;
   2) image preprocessing;
   3) Contourlet transform;
   4) feature extraction;
   5) feature selection;
   6) cross-validation;
   7) classifying the brain disease; and
   8) outputting the brain disease classification result,
   wherein the step of 3) Contourlet transform uses a pyramid directional filter bank contourlet transformation and
   wherein the step of 5) feature selection uses a probabilistic principal component analysis.

2. The method of claim 1, wherein the step of 2) image preprocessing uses contrast limited adaptive histogram equalization.

3. The method of claim 1, wherein the step of 4) feature extraction uses a gray-level co-occurrence matrix.

4. The method of claim 1, wherein the step of 6) cross-validation uses a 10-fold stratified cross-validation.

5. The method of claim 1, wherein the step of 7) classifying the brain disease classifies a multiple kernel support vector machine classifier.

6. The method of claim 1, wherein the step of 8) outputting the brain disease classification result is to output the classification result as normal or abnormal.

7. The method of claim 1, wherein the brain disease is at least one selected from the group consisting of degenerative brain disease, cerebrovascular disease, neoplastic brain disease, stroke, cerebral hemorrhage, multiple sclerosis, brain infection and traumatic brain injury.

* * * * *